United States Patent
Danielson et al.

(10) Patent No.: US 7,835,112 B2
(45) Date of Patent: Nov. 16, 2010

(54) INTEGRATED LEAD FLEXURE WITH EMBEDDED TRACES

(75) Inventors: Reid C. Danielson, Cokato, MN (US); Steve R. Young, Hutchinson, MN (US); Peter F. Ladwig, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 948 days.

(21) Appl. No.: 11/673,949

(22) Filed: Feb. 12, 2007

(65) Prior Publication Data

US 2008/0192384 A1 Aug. 14, 2008

(51) Int. Cl.
*G11B 5/48* (2006.01)
(52) U.S. Cl. .................................... 360/245
(58) Field of Classification Search ............ 360/245.9, 360/245, 245.7; 29/603.03, 603.06
See application file for complete search history.

(56) References Cited

U.S. PATENT DOCUMENTS

| 5,166,845 | A | 11/1992 | Thompson et al. |
| 6,388,201 | B2 | 5/2002 | Yamato et al. |
| 6,841,737 | B2 | 1/2005 | Komatsubara et al. |
| 7,012,017 | B2 | 3/2006 | Brunner et al. |
| 2005/0195528 | A1* | 9/2005 | Bennin et al. ............ 360/234.5 |
| 2007/0022602 | A1 | 2/2007 | Kingsford et al. |
| 2008/0088975 | A1* | 4/2008 | Bennin et al. ............ 360/234.5 |

FOREIGN PATENT DOCUMENTS

JP  2008198324 A  *  8/2008

* cited by examiner

*Primary Examiner*—Allen T Cao
(74) *Attorney, Agent, or Firm*—Faegre & Benson LLP

(57) ABSTRACT

An integrated lead flexure for a disk drive head suspension and method for making the flexure. The flexure includes a spring metal layer, a dielectric layer over the spring metal layer, and a plurality of conductive leads on the dielectric layer. The spring metal layer has a first surface, and the dielectric layer has a first surface opposite the spring metal layer first surface, and a plurality of troughs in least a portion of the dielectric layer. At least some of the leads are disposed in a respective dielectric layer trough.

24 Claims, 9 Drawing Sheets

INTEGRATED LEAD FLEXURE WITH EMBEDDED TRACES

TECHNICAL FIELD

The present invention relates generally to magnetic disk drive head suspensions. In particular, the present invention is a magnetic disk drive head suspension flexure including improved lead and dielectric layer configurations, and methods for making the flexure.

BACKGROUND

Additive processes are known for manufacturing integrated lead head suspension flexures for magnetic disk drives. In one exemplary known additive process, a flexure spring metal layer may be formed from a stainless steel sheet of material. A dielectric layer can then be applied onto the spring metal layer, and conductive leads can be deposited onto the dielectric layer. A protective coating of a corrosion-resistant, conductive metal or dielectric material may also optionally be applied over exposed surfaces of the leads. Other additive processes may include different processing steps and/or different sequences of steps. The particular additive process utilized should provide for strong adhesion between the leads and the dielectric material. Additionally, the leads should be positioned in as compact a configuration as possible so as to facilitate reducing the overall size of the flexure. It is further desirable to minimize the overall material cost and the number of manufacturing processing steps required to form the flexures.

Thus, there is a continuing need for improved disk drive head suspension flexures and methods for making such improved flexures. In particular, there is a need for high-quality integrated lead disk drive head suspension flexures having compact lead configurations, and also for an efficient, cost-effective process for manufacturing such flexures.

SUMMARY

The invention is an integrated lead flexure having an improved lead configuration, and an additive process for making the flexure. A method of making the flexure in accordance with one embodiment of the invention comprises forming a dielectric layer over a spring metal layer of the flexure. At least one trough is formed in at least a portion of the dielectric layer. A plurality of conductive leads are then formed on the dielectric layer. At least a portion of one of the leads is formed in the trough.

DETAILED DESCRIPTION

Figure 1:
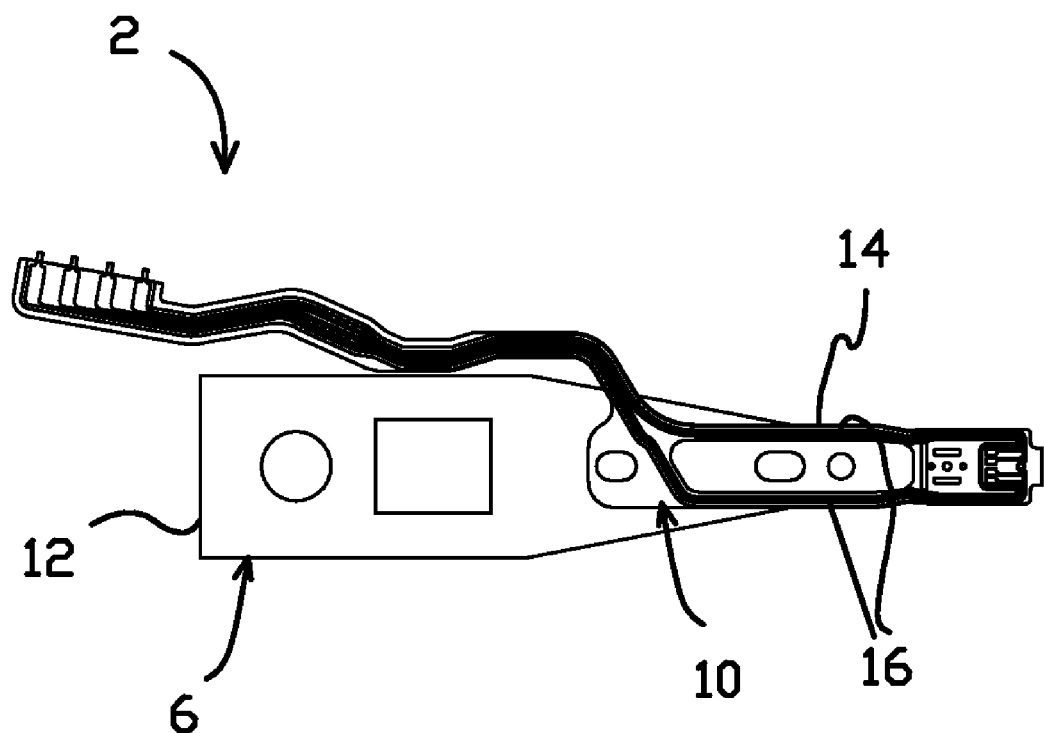
FIG. 1 is an illustration of a disk drive head suspension assembly including a load beam and an integrated lead flexure according to one embodiment of the present invention.

FIG. 1 is an illustration of a disk drive head suspension assembly 2 according to one embodiment of the present invention. As shown in FIG. 1, the head suspension assembly 2 includes a load beam 6 and a flexure 10 according to one embodiment of the present invention. As further shown, the load beam 6 includes a proximal actuator arm mounting region 12 configured for mounting the head suspension assembly 2 to an actuator arm (not shown), and a distal end region 14 to which the flexure 10 is attached. The flexure 10 is configured to support a magnetic head slider (not shown) as is known, and includes a plurality of conductive leads 16 electrically coupling the head slider to other electronic circuitry of the disk drive.

Figure 2:
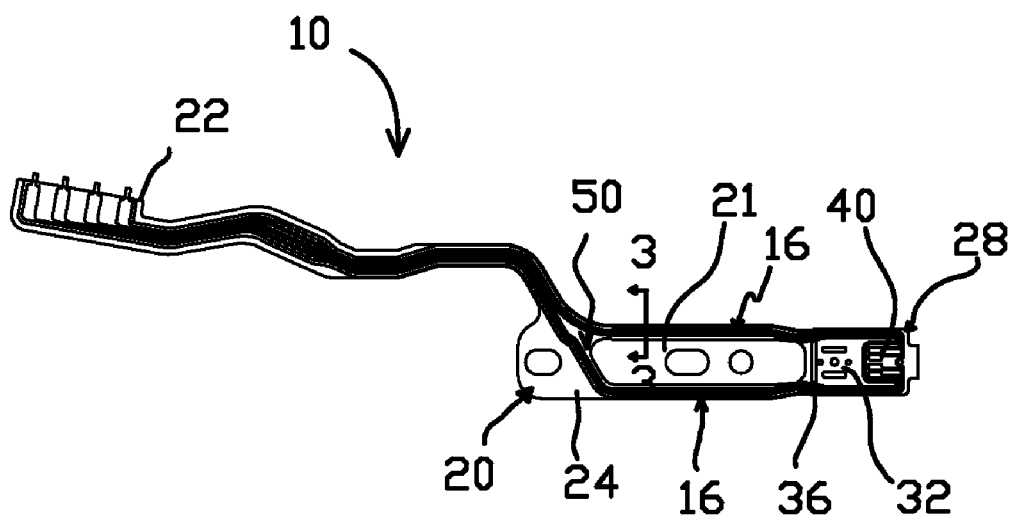
FIG. 2 is an illustration of the flexure of the head suspension assembly of FIG. 1.

FIG. 2 illustrates the flexure 10 separate from the load beam 6. As shown in FIG. 2, the flexure 10 includes a generally flat spring metal layer 20 having a major surface 21, a proximal tail region 22, a mounting region 24, and a distal gimbal region 28. As illustrated, the gimbal region 28 includes a tongue 32 defined by a channel 36 formed through the spring metal layer 20. The tongue 32 operates to support the magnetic head slider (not shown) as is known in the art, and is designed to be resiliently moveable with respect to the remainder of the flexure 10 in response to aerodynamic forces exerted on the head slider during operation of the disk drive. The mounting region 24 is adapted to engage with the load beam 6, and may include various tabs, apertures, and offsets (not shown) to facilitate attachment with the load beam (typically by welding). The spring metal layer 20 can assume a variety of shapes and sizes without departing from the scope of the invention.

The flexure 10 is an integrated lead or wireless structure, with the conductive leads 16 applied over the major surface 21 of the spring metal layer 20 extending from the gimbal region 28 to the tail region 22 of the flexure 10. The conductive leads 16 operate to electrically couple the magnetic head (not shown) and external circuitry (not shown) attached to the conductive leads 16 in the tail region 22 of the flexure 10. In the illustrated embodiment, each of the conductive leads 16 includes a head bonding pad portion 40 in the distal gimbal region 28 adjacent the tongue 32. As is known, the magnetic head is typically attached to the tongue 32, e.g., using an adhesive. The head bonding pad portion 40 of each respective lead 16 may be electrically connected, e.g., by soldering, to a terminal pad on the magnetic head.

The flexure 10 also includes a dielectric layer 50 between the leads 16 and the spring metal layer 20. The dielectric layer 50 operates to support the leads 16 and to electrically isolate the spring metal layer 20 from the leads 16. As will be shown and explained in detail below, at least some of the leads 16 are at least partially embedded in the dielectric layer 50 according to an embodiment of the present invention. This novel lead and dielectric layer configuration will facilitate formation of the leads 16 using a reduced number of processing steps as compared to conventional flexures formed by additive processes, yet can result in strong adhesion between the leads 16 and the dielectric layer 50 and also a reduction in the overall material cost for the flexure 10.

In some embodiments, as shown and explained below, the leads 16 may be wholly or partially covered with a protective noble metal (e.g., gold) plating. In still other embodiments, the noble metal plating may be omitted. Alternatively or additionally, in some embodiments, the flexure 10 may include a dielectric cover layer (not shown) disposed over all or portions of the leads 16. When present, the dielectric cover layer functions as a protective coating over the covered lead portions.

Figure 3:
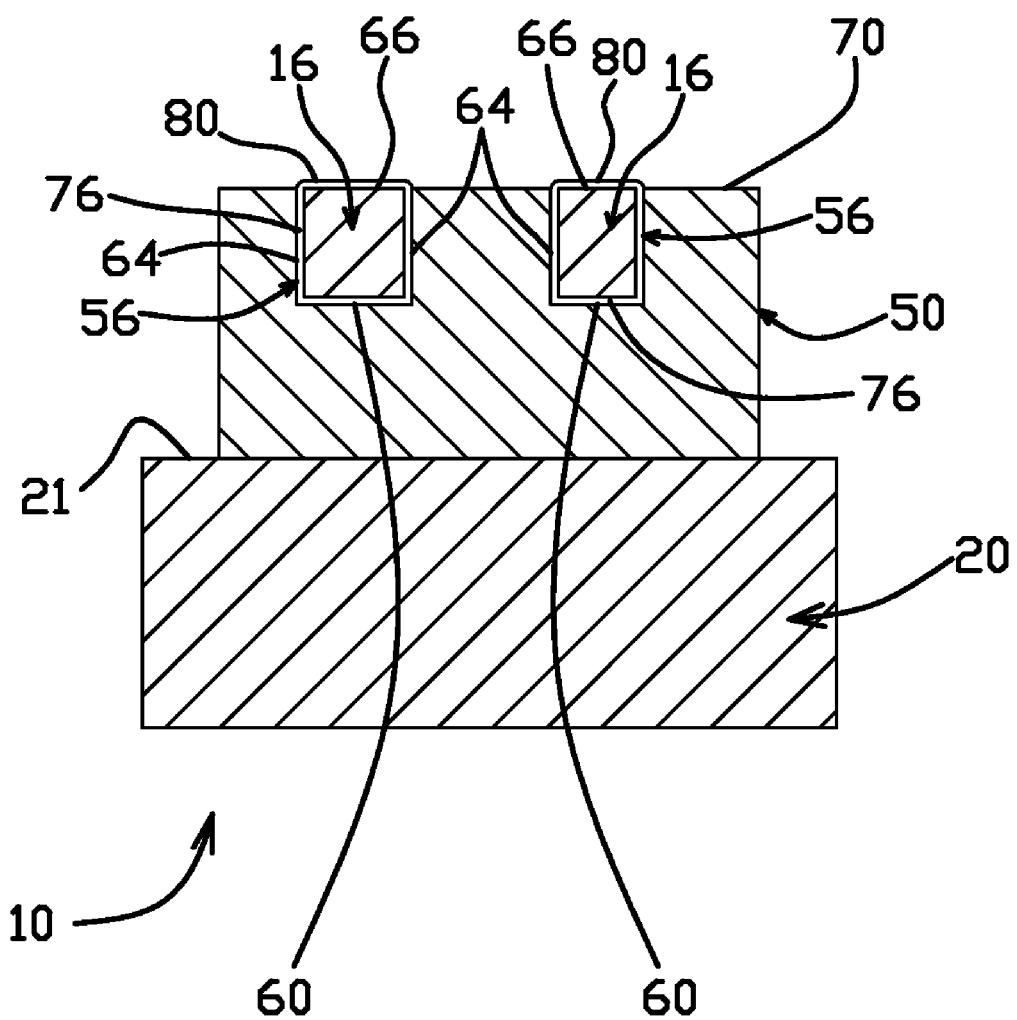
FIG. 3 is a schematic cross-sectional view of a portion of the flexure of FIG. 1 taken along the line 3-3 in FIG. 2.

FIG. 3 is a schematic cross-sectional view of the flexure 10 taken along the line 3-3 in FIG. 2. As shown in FIG. 3, the dielectric layer 50 is disposed on the major surface 21 of the spring metal layer 20, and includes a plurality of troughs 56 formed partially through the thickness of the dielectric layer 50. As further shown, the leads 16 are positioned and embedded in respective troughs 56, generally assuming the same cross-sectional shape as the trough. In the illustrated embodiment, the troughs 56 each have a generally rectangular cross-sectional shape and include a base 60 oriented generally parallel to the spring metal layer 20, and a pair of side walls 64 extending generally transverse to the base 60. In other embodiments, the troughs 56 may take on other cross-sectional shapes, e.g., a "T"-shape or a non-rectangular shape, depending on the particular requirements of the flexure 10 and the leads 16.

As shown, the leads 16 and the dielectric layer 50 include co-planar surfaces 66, 70 opposite the spring metal layer 20. Additionally, the flexure 10 includes a seed layer 76 of conductive material in each of the troughs 56 between the dielectric layer 50 and the respective lead 16. The seed layer 76 may be made of a conductive material such as chromium, and is applied to the dielectric layer 50 to facilitate formation of the leads 16 by an additive process. In the illustrated embodiment, the leads 16 each include a protective metallic plating 80 on the surface 66, which would otherwise be exposed. When present, the protective metallic plating 80 may be made from any suitable corrosion-resistant conductive metal, including without limitation, gold, silver, or nickel.

The troughs 56 provide both a pattern for forming the conductive leads 16 on the flexure 10, as well as support for the leads 16 during subsequent processing, handling, and use. As can be seen in FIG. 3, three sides of the leads 16 can be adhered to the base 60 and the side walls 64 of the troughs 56, thus providing a relatively large attachment surface area and correspondingly strong adhesion between the leads 16 and the dielectric layer 50. Additionally, the dielectric layer 50 operates to protect the portions of the leads 16 embedded therein, thereby obviating the need for a separate protective coating, e.g., the protective metallic plating 80, on the sides of the leads 16 which would otherwise be exposed if not embedded in the dielectric layer. Elimination of this protective side coating further allows the leads 16 to be positioned relatively close together, thus providing for a relatively compact flexure design. Still additionally, forming the leads 16 in the troughs 56 avoids the need for an additional photolithography step by which a separate mask layer is applied to form the pattern for the leads 16 and subsequently removed. The troughs 56 can, in some embodiments, be formed in the same processing step as is used to form the dielectric layer 50 in general, thus minimizing the number of processing steps required.

It will be appreciated that the leads 16 need not be disposed in the troughs 56 along the entire length of the lead 16. To the contrary, in various embodiments, only portions of the leads 16 may be disposed in respective troughs 56. Additionally, in some embodiments, one or more leads 16 may be disposed within one of the troughs 56, while other leads may be disposed on the dielectric layer 50 but not in one of the troughs 56.

The spring metal layer 20, the leads 16, and the dielectric layer 50 can be made from any materials known in the art or later developed for comparable structures in head suspension flexures manufactured by any additive process. In one embodiment, the spring metal layer 20 is made substantially from stainless steel. In various embodiments, the material making up the dielectric layer 50 is selected based on the design and functional requirements of the flexure 10 and the particular process used to form the dielectric layer 50. In one embodiment, the dielectric layer 50 may be made from a dielectric polymer. In one such embodiment, the dielectric layer 50 is made from photosensitive polyimide. In other embodiments, the dielectric layer 50 may be made from multiple layers of dielectric polymer materials, including for example, layers of photosensitive and non-photosensitive polyimide.

In one embodiment, the conductive leads 16 are made from copper or copper alloys. In other embodiments, all or portions of the leads 16 may be made of noble metals such as gold. In still other embodiments, the leads 16 may have multi-layer structures including layers of different conductive materials. For example, in some embodiments, the flexure 10 may include stacked leads 16 with layers of dielectric material disposed between adjacent lead layers. In some embodiments, the flexure 10 may include one or more conductive ground plane layers (not shown) disposed between the spring metal layer 20 and the leads 16. Still other materials and flexure lead and dielectric layer configurations will be apparent to those skilled in the art based on the foregoing.

Figure 4:
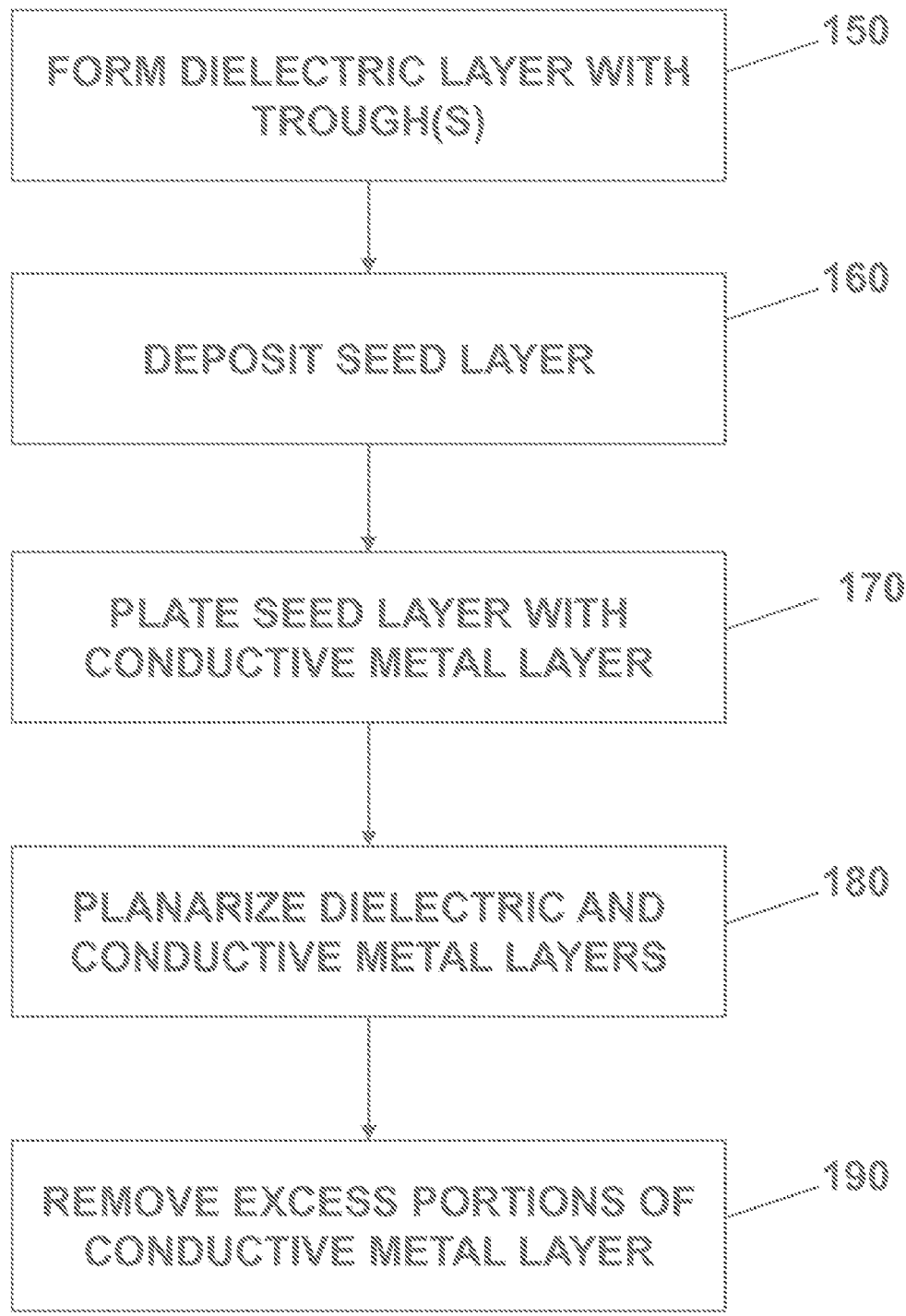
FIG. 4 is a flowchart illustrating a method of manufacturing the flexure of FIG. 1 according to one embodiment of the present invention.

FIG. 4 is a flowchart illustrating a method of manufacturing the flexure 10 according to one embodiment of the present invention. As shown in FIG. 4, the dielectric layer, including the troughs for containing the conductive leads, is formed on the stainless steel spring metal layer. (Block 150) The seed layer is then deposited on the dielectric layer and any exposed portions of the spring metal layer. (Block 160) Next, a conductive metal layer is deposited on the seed layer at least in the dielectric layer troughs. (Block 170) The dielectric layer and the conductive metal layer are then planarized to form coplanar lead and dielectric layer surfaces opposite the spring metal layer. (Block 180) Any excess or unnecessary portions of the conductive metal and/or seed layers, e.g., portions deposited on the exposed portions of the spring metal layer, are then removed. (Block 190) From there, additional processing steps (e.g., additional stainless steel etching steps) are performed to complete the flexure 10.

Figure 5A:
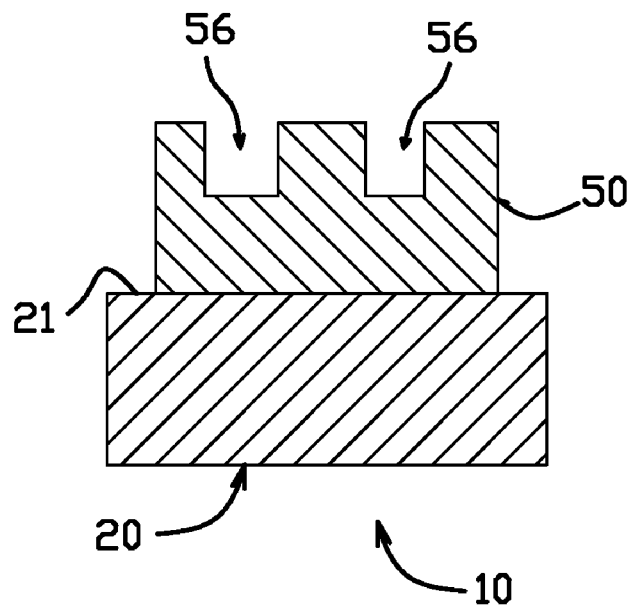
FIGS. 5A through 5G illustrate cross-sectional views of the flexure of FIG. 1 during the sequential manufacturing process steps described in FIG. 4.

FIGS. 5A through 5G illustrate cross-sectional views of the flexure 10 as shown in FIG. 3 during the sequential manufacturing process steps described in FIG. 4. As shown in FIG. 5A, after a stainless steel roll or sheet is prepared to correspond to the spring metal layer 20 according to known methods, the dielectric layer 50 including the troughs 56 is formed on the major surface 21 of the spring metal layer 20. The dielectric layer 50, and in particular, the troughs 56 can be formed by any suitable process. In one embodiment, a layer of dielectric material, e.g., polyimide, is applied to the spring metal layer 20 and subsequently laser ablated to form the troughs 56. In such an embodiment, the depths of the troughs 56 can be controlled based on the type and intensity of the applied laser energy.

In various other embodiments, the dielectric layer 50 including the troughs 56 can be formed using a lithography process. For example, in one embodiment, layers of photosensitive and non-photosensitive dielectric material can be co-extruded onto the spring metal layer 20. In such an embodiment, the non-photosensitive layer can be applied directly to the major surface 21 of the spring metal layer 20, with the photosensitive layer located opposite the spring metal layer 20. The troughs 56 can then be formed by laser ablation or by a conventional photolithography process. In other embodiments, other known lithography processes, e.g., imprint lithography, may be used to form the dielectric layer 50 including the troughs 56. Other methods and techniques for forming the dielectric layer 50 and the troughs 56 will become apparent to those skilled in the art based on the foregoing.

Figure 5B:
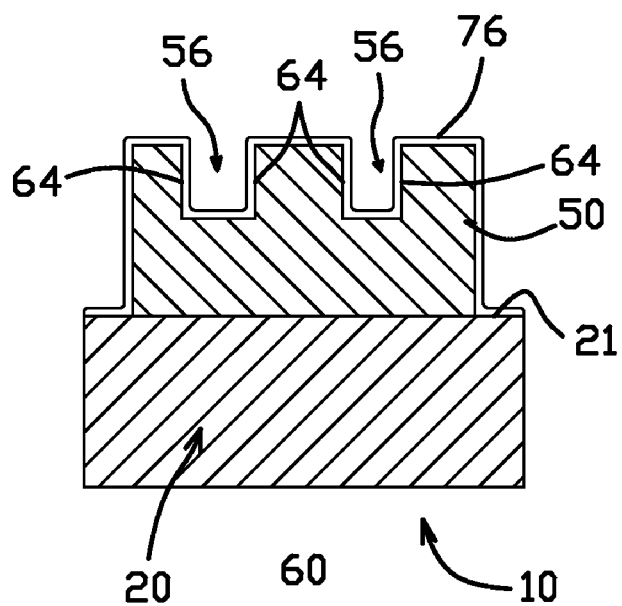

Next, as shown in FIG. 5B, the seed layer 76 is applied to the dielectric layer 50. As illustrated, the seed layer 76 is applied over the entire dielectric layer 50, including the entire surface of the base 60 and the side walls 64 of each of the troughs 56. In the illustrated embodiment, the seed layer 76 is further applied over exposed portions of the major surface 21 of the spring metal layer 20 adjacent the dielectric layer 50, although this is not a requirement (i.e., portions of the flexure 10 on which the seed layer 76 is not to be applied could be masked off prior to depositing the seed layer 76). The seed layer 76 can be applied to the flexure 10 using any process, whether now known or later developed, suitable to deposit seed layer material, such as chromium or chromium alloys, onto the surface of the dielectric layer 50. In one embodiment, the seed layer 76 is deposited using a vacuum deposition, chemical vapor deposition, or physical vapor deposition process. The seed layer 76 operates as an electrical reference during a subsequent plating process.

Figure 5C:
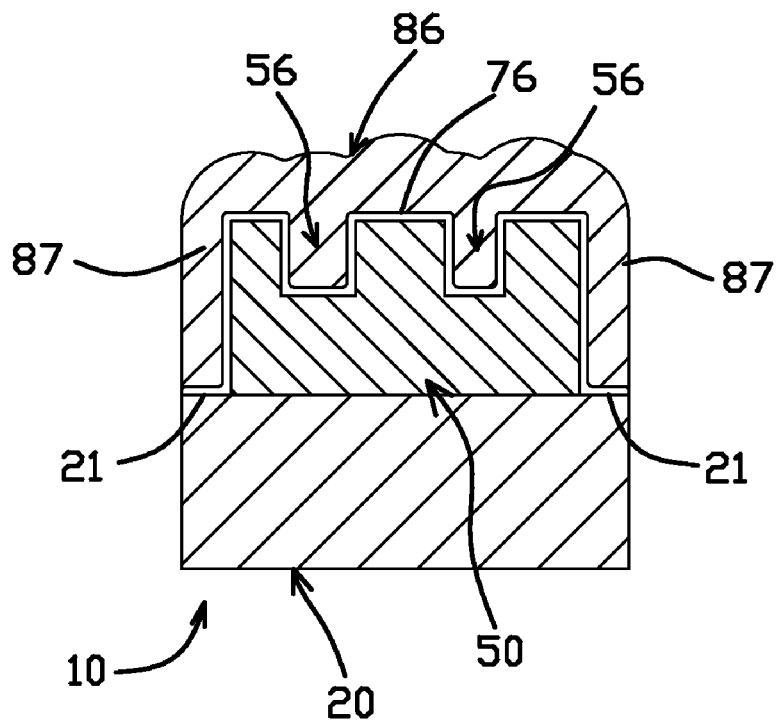

As shown in FIG. 5C, a conductive metal layer 86 is then applied to the onto the seed layer 76. In the illustrated embodiment, portions of the conductive metal layer 86 corresponding to the leads 16 (see FIG. 3) over-fill the troughs 56 such that these portions have a thickness greater than the dimensions of the side walls 64 of the troughs 56. The conductive metal layer 86 may be made of any conductive metal material suitable for integrated lead flexure leads. That is, the material selected for the conductive metal layer 86, and thus the leads 16, will be determined based on the particular design and performance requirements of the flexure 10. In one embodiment, the conductive metal layer 86 is made of copper or a copper alloy.

The conductive metal layer 86 can be applied using conventional electroplating or electroless plating processes. In the illustrated embodiment, the conductive metal layer 86 is applied onto the entire seed layer 76, and thus includes portions 87 applied over the exposed portions of the major surface 21 of the spring metal layer 20 adjacent the dielectric layer 50. In another embodiment, additional steps may be performed such that the conductive metal layer 86 is applied only into the troughs 56. For example, the portions of the dielectric layer 50 adjacent the troughs 56 as well as the exposed portions of the major surface 21 of the spring metal layer 20 may be masked using photolithography techniques prior to plating the conductive metal layer 86. In such an embodiment, only the unmasked surfaces of the seed layer 76 within the troughs 56 will be plated with the conductive metal layer 86. Still other methods for applying the conductive metal layer 86 to the flexure 10 will apparent to those skilled in the art based on the foregoing.

Figure 5D:
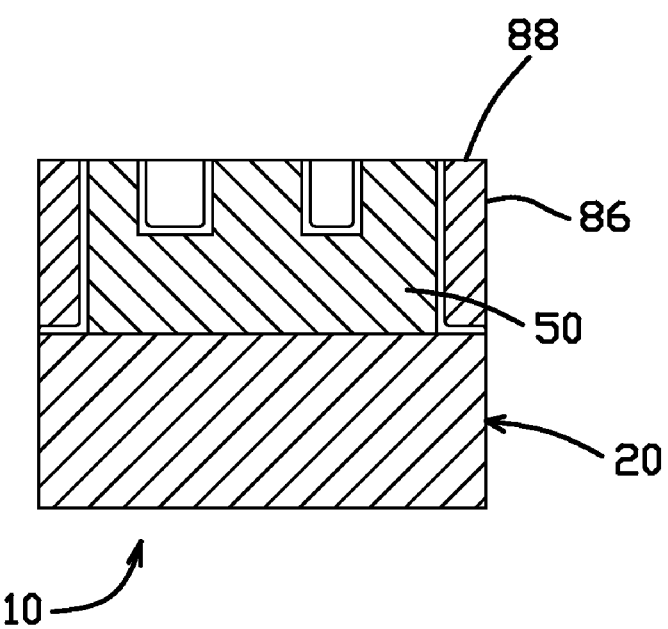

Next, as shown in FIG. 5D, a planarizing step is performed on the conductive metal layer 86 and the dielectric layer 50 so as to form a planar surface 88 opposite the spring metal layer 20 corresponding to the substantially co-planar surfaces 66, 70 of the completed flexure 10 (see FIG. 3). The planarization step may be accomplished using any process or technique, whether now known or later developed, suitable for removing excess conductive metal layer 86 material to form the planar surface 88. In various embodiments, such processes may include mechanical and/or chemical machining processes such as are known in the art of manufacturing semi-conductor components. In one embodiment, a chemical-mechanical polishing ("CMP") process, such as commonly employed in semi-conductor wafer production, may be adapted for use in a web-based, roll-to-roll process suitable for high-volume head suspension flexure production. As will be appreciated, CMP involves, generally, polishing the desired surface with a polishing pad and the aid of an abrasive and corrosive chemical slurry so as to produce a planar, polished surface. A CMP process can effectively remove excess portions of the conductive metal layer 86 to form the planar surface 88, thereby facilitating further processing steps to complete the flexure 10.

Figure 5E:
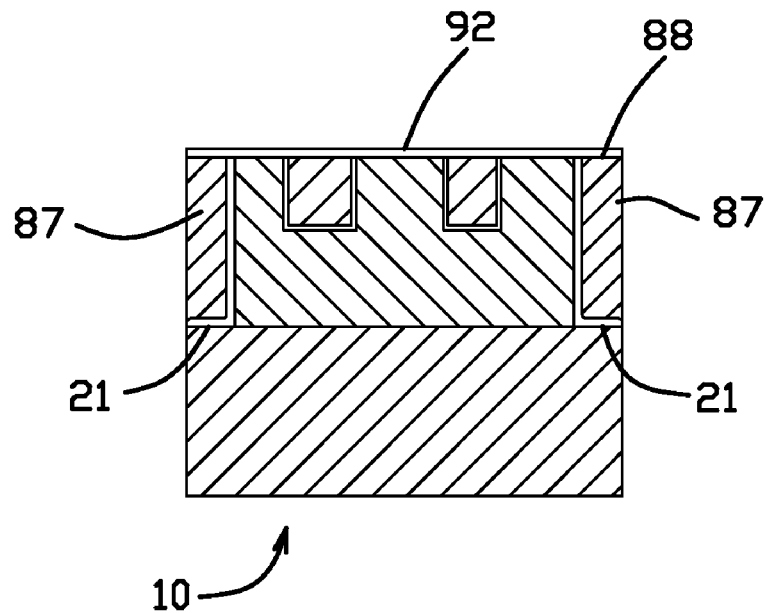
Figure 5F:
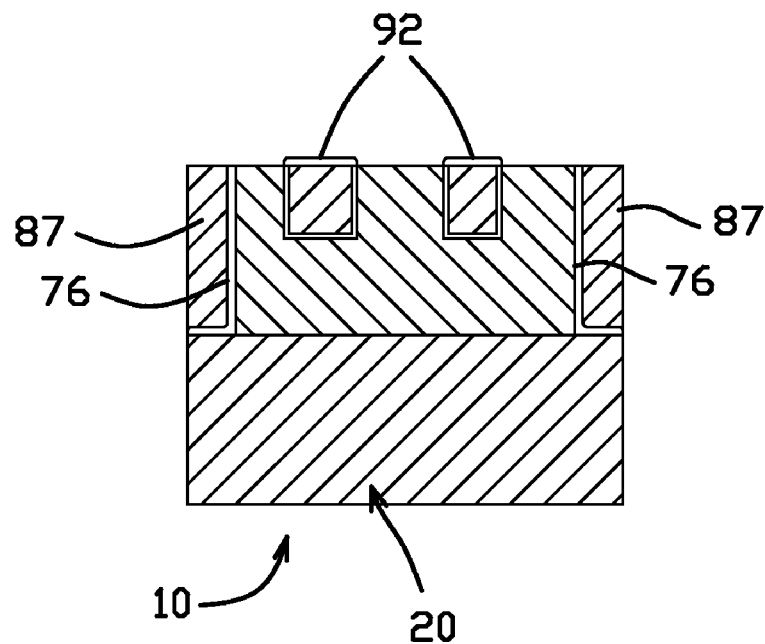
Figure 5G:
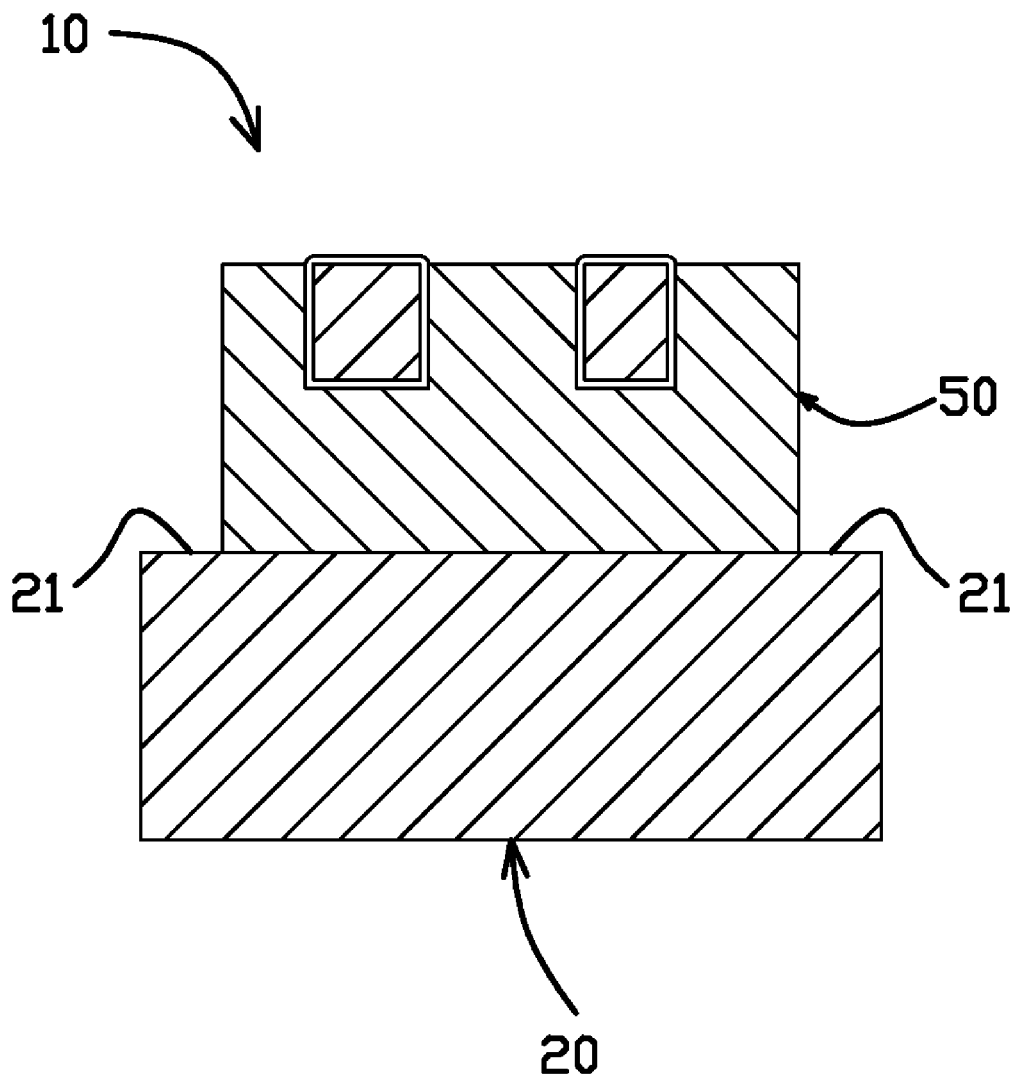

After planarization is completed and the planar surface 88 is formed, the excess conductive metal layer portions 87 overlaying the exposed portions of the major surface 21 of the spring metal layer 20 adjacent the dielectric layer 50 may be removed. One embodiment for removing the excess conductive metal layer portions 87 is illustrated in FIGS. 5E through 5G. As shown in FIG. 5E, a second conductive metal layer 92 is applied to the planar surface 88. In various embodiments, the second conductive metal layer 92 may be made from a corrosion-resistant metal such as, without limitation, gold, nickel, silver, or alloys thereof, and corresponds to the protective metal plating 80 over the leads 16 (see FIG. 3). The second conductive metal layer 92 can be applied using any known plating process, e.g., electroplating or electroless plating.

Next, as shown in FIG. 5F, portions of the second conductive metal layer 92 can be stripped away such that only those portions corresponding to the protective metal plating structures 80 over the leads 16 remain (see FIG. 3). This can be accomplished using any known method or technique. In this embodiment, the remaining portions of the second conductive metal layer 92 (i.e., the protective metal plating 80) can thus operate as a mask layer over the leads 16, with the excess portions 87 of the conductive metal layer 86 being unmasked such that they can be removed, along with any unmasked regions of the seed layer 76. In one embodiment, the excess portions 87 of the conductive metal layer 86 are removed by an etching process as is known in the art.

FIG. 5G schematically illustrates the flexure 10 after removing the excess portions 87 of the conductive metal layer 86. As shown in FIG. 5G, portions of the major surface 21 of the spring metal layer 20 adjacent the dielectric layer 50 are now substantially or entirely free of the seed layer 76 and the conductive metal layer 86.

In an alternative to the embodiment illustrated in FIGS. 5E through 5G, the excess portions 87 of the conductive metal layer 86 may be removed using a conventional photolithography process prior to applying the second conductive metal layer 92. For example, in one such embodiment, a mask layer can be applied over the planar surface 88 and patterned such that the excess portions 87 of the conductive metal layer 86 are unmasked. The excess portions 87 can then be etched away and the mask layer can be subsequently removed using known methods and techniques. If desired, the second conductive metal layer 92 may then be applied and the protective metallic plating 80 may be formed on the leads 16 as shown in FIGS. 5E and 5F described above.

After removal of the excess portions 87 of the conductive metal layer 86, fabrication of the flexure 10 can then proceed according to known methods and techniques. For example, if desired, an additional dielectric cover layer may be applied over all or part of the leads and/or other flexure structures. Additionally, if desired, the steps described above can be repeated to form additional dielectric and lead layers on the flexure. In some embodiments, additional steps can be performed to etch away portions of the spring metal layer and dielectric layer to form so-called "flying lead" portions, which can subsequently be plated with a protective coating (e.g., a gold or nickel plating). Still other manufacturing processes can be performed as required depending on the particular design and requirements of the flexure.

Figure 6:
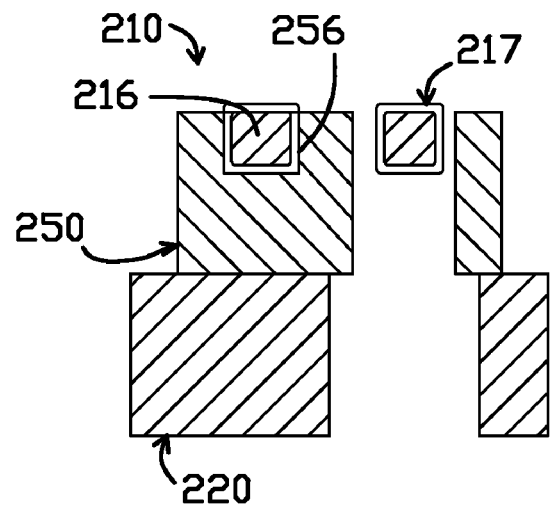
FIGS. 6 through 8 are schematic cross-sectional views of portions of respective flexures according to additional embodiments of the present invention.
Figure 7:
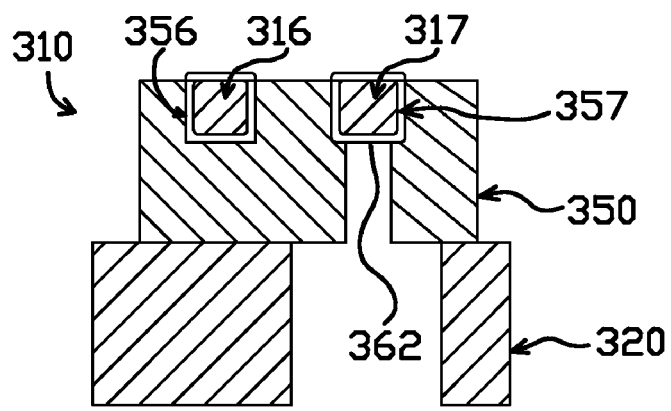
Figure 8:
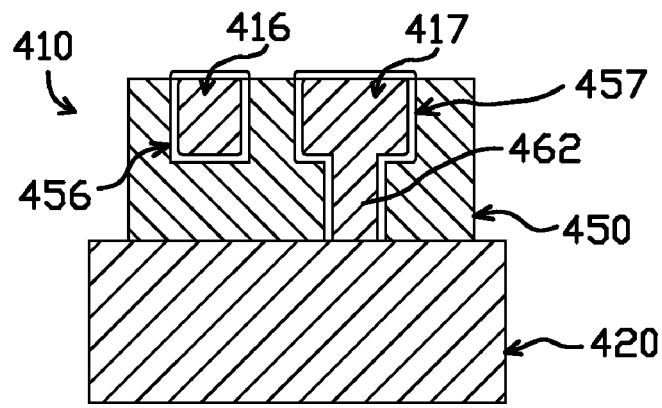

FIGS. 6 through 8 are schematic cross-sectional views of portions of flexures 210, 310, and 410, respectively, including alternative lead configurations according to further embodiments of the present invention. As shown in FIG. 6, the flexure 210 includes leads 216, 217, a spring metal layer 220, and a dielectric layer 250 on the spring metal layer 220. As further shown, the lead 216 is disposed in a trough 256 in the dielectric layer 250, while the illustrated portion of the lead 217 is a flying lead portion that is not backed by the spring metal layer 220, and is not positioned within one of the troughs 256. The flying lead portion of the lead 217 may be incorporated, for example, to provide desired flexure flexibility characteristics or to provide access to the leads for making electrical connections to the head slider and other electronic components and circuitry. The flexure 210 can be manufactured in accordance with the process described above in connection with the flexure 210, with the lead 217 formed in a trough in the dielectric layer 250 similar to the trough 256 concurrently with the other lead 216 in an intermediate manufacturing step. Portions of the dielectric layer 250 can be subsequently etched away (along with portions of the spring metal layer 220) to expose the flying lead portion of the lead 217.

As shown in FIG. 7, the flexure 310 is substantially similar to the flexure 210 and includes leads 316, 317, a spring metal layer 320, and a dielectric layer 350 on the spring metal layer 320. As further shown, the leads 316 and 317 are disposed in troughs 356, 357, respectively, in the dielectric layer 350. In the illustrated embodiment, portions of the spring metal layer 320 and the dielectric layer 350 are etched away to expose an exposed portion 362 of the lead 317. Unlike the lead 217 of the flexure 210, the lead 317 remains partially embedded in the trough 357 and thereby partially supported by the dielectric layer 350. The exposed portion 362 provides backside access to the lead 317 for various purposes including, for example, making electrical connections to the lead 317.

As shown in FIG. 8, the flexure 410 is substantially similar to the flexures 10, 210, and 310 described above, and includes leads 416, 417, a spring metal layer 420, and a dielectric layer 450 on the spring metal layer 420. As further shown, the leads 416 and 417 are disposed in troughs 456, 457, respectively, in the dielectric layer 450. In the illustrated embodiment, the lead 417 includes a ground portion 462 contacting and electrically coupled to the spring metal layer 420. The lead 417 can be formed by the process described above in connection with the flexure 10, with the additional step of forming the lower portion of the trough corresponding to the ground portion 462 prior to depositing the seed layer and the conductive metal layer onto the flexure 410 (see FIGS. 5B and 5C).

The novel flexure of the present invention offers a number of advantages over conventional flexures. For example, because the leads are partially embedded in the dielectric layer, the total exposed surface area of the leads is minimized. This in turn reduces the necessary amount of protective metallic plating, which typically includes a relatively expensive material such as gold, silver or nickel, as compared to conventional flexure designs. Eliminating the protective metallic plating between adjacent leads further allows the leads to be positioned more closely together on the spring metal layer, thus minimizing the overall size of the flexure. Additionally, the contact surface area between the leads and the dielectric layer is greatly increased, thus providing improved adherence between the leads and the dielectric layer. Furthermore, utilizing the dielectric layer troughs to pattern and form the leads can, in some embodiments, reduce the overall number of processing steps by, for example, eliminating an additional photolithography step that would otherwise be necessary to pattern the leads.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

We claim:

1. A method of forming an integrated lead flexure, the method comprising:
   forming a dielectric layer on a spring metal layer, including forming a trough along at least a portion of the dielectric layer; and
   forming a plurality of conductive leads on the dielectric layer, including forming at least a portion of at least one lead of a plurality of conductive leads in the trough.

2. The method of claim 1 free from the removal of the dielectric layer after forming the plurality of conductive leads.

3. The method of claim 1 wherein:
   forming the dielectric layer includes forming a plurality of troughs along at least a portion of the dielectric layer; and
   forming the conductive leads includes forming a plurality of leads on the dielectric layer, including forming at least a portion of each of the leads in one of the troughs.

4. The method of claim 3 wherein:
   forming the plurality of troughs includes forming troughs each having a base that is generally parallel to the spring metal layer and a pair of opposed side walls extending generally transverse to the base.

5. The method of claim 1 and further comprising planarizing a surface of the conductive leads and the dielectric layer.

6. The method of claim 5 wherein the planarizing step includes chemical-mechanical polishing the surface of the conductive leads and the dielectric layer.

7. The method of claim 1 wherein forming the dielectric layer includes:
   coating the spring metal layer with a dielectric material; and
   removing portions of the dielectric material to pattern the dielectric layer and form the trough.

8. The method of claim 7 wherein removing portions of the dielectric material exposes portions of the spring metal layer adjacent the dielectric layer.

9. The method of claim 7 wherein removing portions of the dielectric material includes laser ablating the dielectric material.

10. The method of claim 7 wherein removing portions of the dielectric material includes removing portions of the dielectric material using a photolithography process.

11. The method of claim 7 wherein removing portions of the dielectric material includes removing portions of the dielectric material using an imprint lithography process.

12. The method of claim 7 wherein:
   coating the spring metal layer includes coating the spring metal layer with first and second layers of dielectric material; and removing portions of the dielectric material includes removing portions of the second layer of dielectric material to form the trough.

13. The method of claim 12 wherein:

coating the spring metal layer includes coating the spring metal layer with a first layer of dielectric material including a non-photosensitive polyimide and a second layer of dielectric material including a photosensitive polyimide; and removing portions of the dielectric material includes removing portions of the second layer of dielectric material using a photolithography process.

14. The method of claim 7 wherein forming the conductive leads includes depositing a conductive metal in the trough.

15. The method of claim 7 wherein forming the conductive leads includes depositing a seed layer on substantially the entire dielectric layer.

16. The method of claim 15 wherein forming the conductive leads includes plating a conductive metal layer on the seed layer.

17. The method of claim 16 and further comprising planarizing a surface of the conductive metal layer and the dielectric layer.

18. The method of claim 17 wherein the planarizing step includes chemical-mechanical polishing the conductive metal layer.

19. The method of claim 17 and further comprising removing excess portions of the conductive metal layer plated onto the seed layer.

20. The method of claim 19 wherein removing the excess portions of the conductive metal layer includes:

plating surfaces of the conductive metal layer and the dielectric layer opposite the spring metal layer with a second conductive metal layer;

removing portions of the second conductive metal layer plated onto the excess portions of the conductive metal layer; and etching the conductive metal layer using the second conductive metal layer as a mask.

21. An integrated lead flexure for a disk drive head suspension, comprising:

a spring metal layer having a first surface;

a dielectric layer on the first surface of the spring metal layer having:

a first surface opposite the spring metal layer first surface; and a plurality of troughs in least a portion of the first surface of the dielectric layer; and a plurality of conductive leads in the dielectric layer troughs.

22. The flexure of claim 21 wherein each of the troughs includes a base oriented generally parallel to the spring metal layer and a pair of opposed side walls extending generally transverse to the base.

23. The flexure of claim 22 and further comprising a seed layer of conductive metal in each of the troughs between the respective lead and the side walls and the base.

24. The flexure of claim 21 wherein the leads each include:

a first surface that is coplanar to the first surface of the dielectric layer; and a protective covering on the first surface.

* * * * *